United States Patent
Wang

(10) Patent No.: US 10,337,492 B2
(45) Date of Patent: Jul. 2, 2019

(54) WIND POWER GENERATION SYSTEM

(71) Applicant: Shun-Shen Wang, Taoyuan (TW)

(72) Inventor: Shun-Shen Wang, Taoyuan (TW)

(*) Notice: Subject to any disclaimer, the term of this patent is extended or adjusted under 35 U.S.C. 154(b) by 0 days.

(21) Appl. No.: 15/880,548

(22) Filed: Jan. 26, 2018

(65) Prior Publication Data

US 2019/0093627 A1 Mar. 28, 2019

(30) Foreign Application Priority Data

Sep. 25, 2017 (TW) .............................. 106132709 A

(51) Int. Cl.
| | | |
|---|---|---|
| *F03D 9/00* | (2016.01) | |
| *F03D 3/04* | (2006.01) | |
| *F03D 9/25* | (2016.01) | |
| *F03D 3/06* | (2006.01) | |

(52) U.S. Cl.
CPC ............ *F03D 3/0427* (2013.01); *F03D 3/062* (2013.01); *F03D 9/25* (2016.05); *F05B 2240/10* (2013.01); *F05B 2240/211* (2013.01)

(58) Field of Classification Search
CPC .......... F03D 3/0427; F03D 3/062; F03D 9/25; F05B 2240/10; F05B 2240/211
USPC ................................ 290/44, 55; 415/4.1, 4.2
See application file for complete search history.

(56) References Cited

U.S. PATENT DOCUMENTS

| | | | | |
|---|---|---|---|---|
| 4,421,452 A | * | 12/1983 | Rougemont | .............. F03D 1/04 415/4.2 |
| 7,493,759 B2 | * | 2/2009 | Bernitsas | ................ F03B 17/06 60/497 |
| 7,772,712 B2 | * | 8/2010 | Frayne | ...................... F03B 5/00 290/1 R |
| 7,821,144 B2 | * | 10/2010 | Frayne | .................... F03B 17/06 290/1 R |
| 8,390,137 B2 | * | 3/2013 | Bryfogle | .............. H02K 7/1876 290/1 R |
| 2008/0129254 A1 | * | 6/2008 | Frayne | .................... F03B 17/06 322/3 |
| 2009/0155043 A1 | * | 6/2009 | Krippene | .................. F03D 1/04 415/4.2 |
| 2011/0280707 A1 | * | 11/2011 | Iskrenovic | ............ F03D 3/0418 415/4.2 |

* cited by examiner

*Primary Examiner* — Julio C. Gonzalez

(57) ABSTRACT

The wind power generation system comprises a generator, a shaft, at least one leaf group and at least one wind-guiding structure. The generator includes a rotor, and the shaft is connected to the rotor. The leaf group includes a movable barrel, at least one first blade, at least one propeller blade, a plurality of pressurized channels, a first vortex chamber and a decompression chamber. The movable barrel is movably sleeved on the shaft. The first blade is connected to the activity barred. The propeller blade is connected to the movable barrel and above the first blade.

9 Claims, 11 Drawing Sheets

WIND POWER GENERATION SYSTEM

BACKGROUND OF THE INVENTION

Field of the Invention

The present invention relates to a wind power generation system, more particularly to a wind power generation system comprising a leaf group and a wind-guiding structure.

Description of Related Art

Please refer to FIG. 1. FIG. 1 illustrates the Taiwan patent M515592 "WIND POWER GENERATION DEVICE". The wind power generation device 10 is a vertical-axis wind turbine. The wind power generation device 10 comprises a shaft 11, a plurality blades 5 and a power module 7. The blades are moved by an external airflow to rotate the shaft. Then, the rotating shaft 11 makes the power module 7 generate an induced current. However, when the wind gets bigger, a rotating speed of the shaft 11 would become too fast. However, the power module 7 is easily damaged due to too fast rotating speed of the shaft 11. On the contrary, when the winds gets smaller, the rotating speed of the shaft 11 would become too slow. Thus, a power generation efficiency of the wind power generation device 10 is reduced.

How to improve on the above problems of the wind power generation device 10 is worthy to be considered by the person having ordinary skill in the art.

SUMMARY OF THE INVENTION

The purpose of the present invention is to provide a wind power generation system that could concentrate a wind volume to achieve an excellent power generation efficiency. Furthermore, the wind power generation system could avoid that a rotation of a shaft becomes too fast.

The wind power generation system comprises a generator, a shaft, at least one leaf group and at least one wind-guiding structure. The generator includes a rotor, and the shaft is connected to the rotor. The leaf group includes an movable barrel, at least one first blade, at least one propeller blade, a plurality of pressurized channels, a first vortex chamber and a decompression chamber. The movable barrel movably is sleeved on the shaft. The first blade is connected to the activity barred. The propeller blade is connected to the movable barrel and above the first blade. In addition, the wind-guiding structure includes a plurality of pressurized channels, a first vortex chamber and a decompression chamber. The pressurized channel includes an entrance or an outlet, and a volume of the pressurized channel from the entrance to the outlet gradually is reduced. The first vortex chamber is interconnected with the pressurized channel via the outlet. The decompression chamber is surrounded by an annular board. The decompression chamber is above and interconnected with the first vortex chamber. Wherein when the first blade is at rest, the first blade is in the first vortex chamber.

In the above wind power generation system, the shaft includes a lifting groove, and the leaf group includes a guide rod which is through the movable barrel and embedded in the lifting groove.

In the above wind power generation system, the lifting groove includes a top area, a bottom area and a bending section, and the bending section is between the top area and the bottom area. Wherein a first angle is generated by the lifting groove which is between the top area and the bending section and a vertical virtual line. The first angle is equal to or less than 30 degrees. Wherein a second angle is generated by the lifting groove which is between the bottom area and the bending section and a horizontal virtual line. The second angle is equal to or less than 30 degrees.

In the above wind power generation system, when an airflow is out the outlet, the airflow is mainly jetted to the first blade.

In the above wind power generation system, the leaf group includes at least one a second blade, and the second blade is connected to the movable barrel and under the first blade.

In the above wind power generation system further comprising a frame, a plurality of the wind-guiding structures is disposed at the frame in a stacked manner.

In the above wind power generation system, a surface of the pressurized channel includes a plurality of guide grooves, and the guide groove is near the outlet.

In the above wind power generation system further comprises a top cover and a blocking ring, and the top cover is disposed at a top of the shaft, and the blocking ring is sleeved on the shaft and under the movable barrel.

In the above wind power generation system, the pressurized channel further includes a second vortex chamber and a through hole, and the second vortex chamber is in the pressurized channel, and the second vortex chamber is interconnected with a guide channel which is outside the pressurized channel via the through hole.

In the above wind power generation system, the second vortex chamber includes a slit outlet, and an airflow in the second vortex is jetted from the slit outlet.

The foregoing, as well as additional objectives, features, and advantages of the present invention will be more readily apparent from the following detailed description, which proceeds with reference to the accompanying drawings.

DETAILED DESCRIPTION OF THE INVENTION

Figure 1:
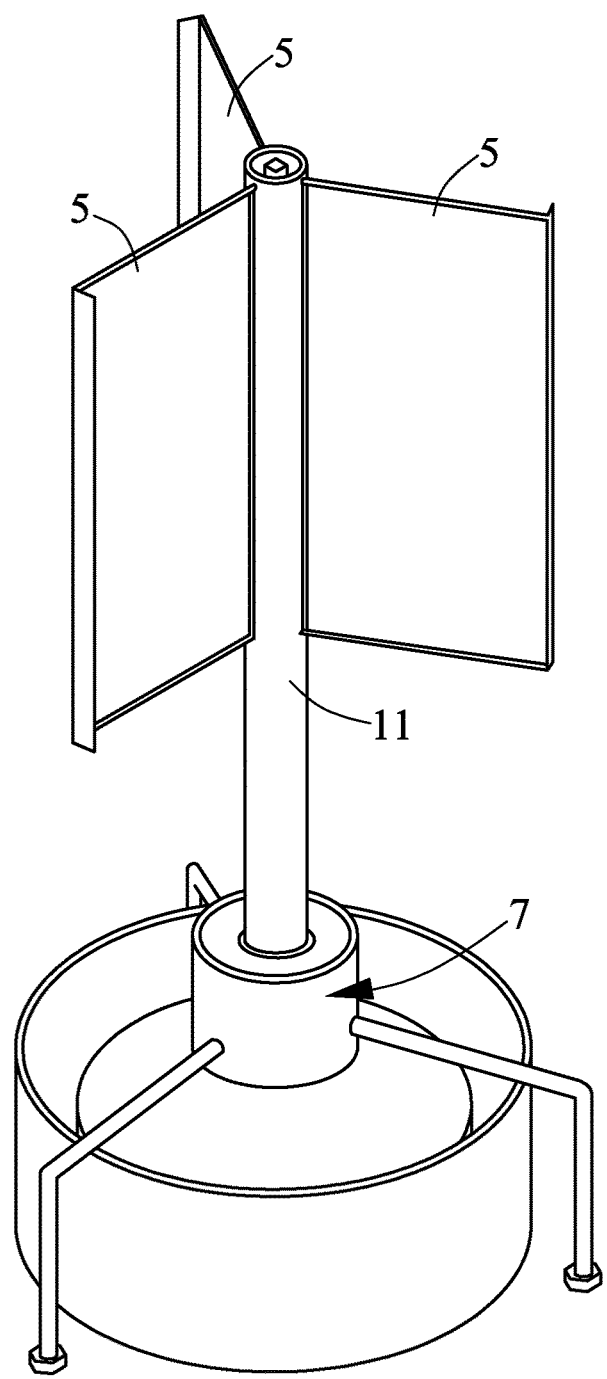
FIG. 1 illustrates the Taiwan patent M515592 "WIND POWER GENERATION SYSTEM"
Figure 2A:
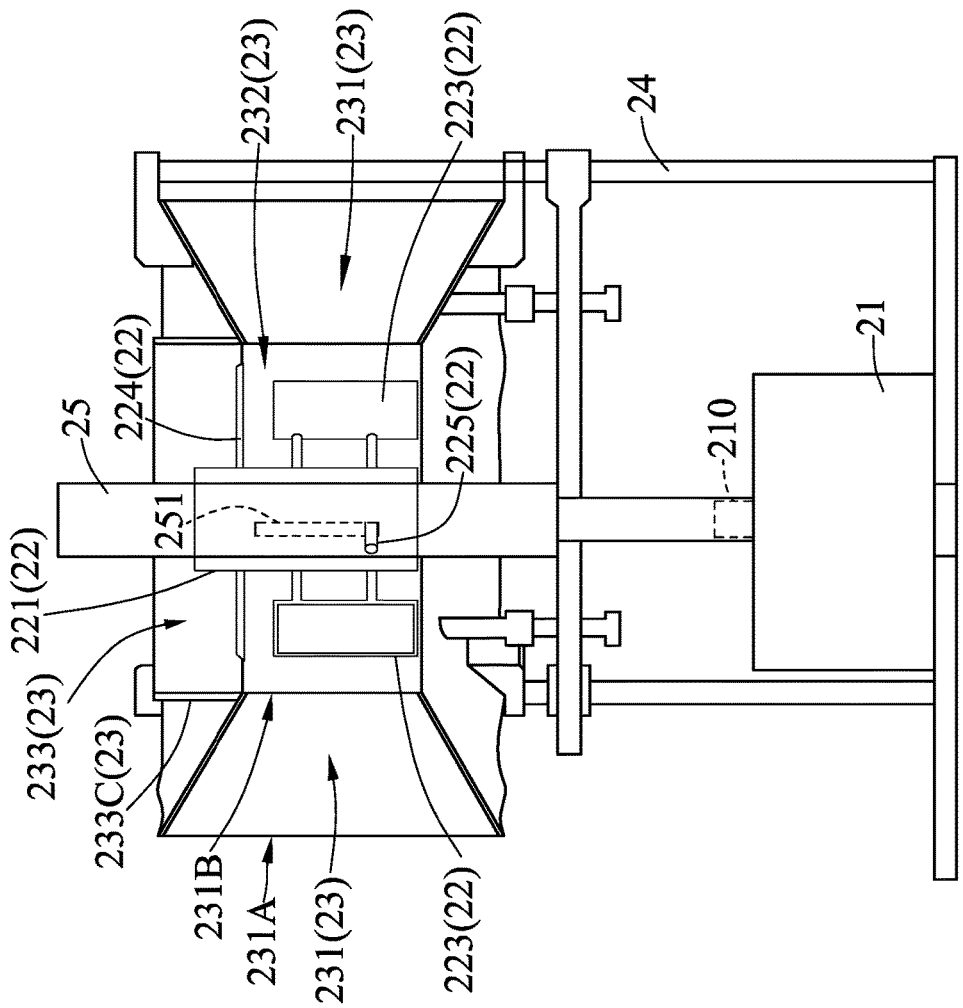
FIG. 2A illustrates a wind power generation system 20 in accordance with first embodiment of the present invention.

Please refer to FIG. 2A. FIG. 2A illustrates a wind power generation system 20 in accordance with first embodiment of the present invention. The wind power generation system 20 comprises a generator 21, a shaft 25, a leaf group 22, a wind-guiding structure 23 and a frame 24. The generator 21 includes a rotor 210 connected to the shaft 25. The leaf group 22 includes an movable barrel 221, at least one first blade 223, at least one propeller blade 224 and a guide rod 225. The movable barrel 221 is movably sleeved on the shaft 25. Both the first blade 223 and the propeller blade 224 are connected to the movable barrel 221, and the propeller blade 224 is disposed above the first blade 223. In addition, the shaft 25 includes a lifting groove 251. The guide rod 225 passes through the movable barrel 221 and is embedded in the lifting groove 251. Thus, when the guide rod 225 is moving up and down in the lifting groove 251, the movable barrel 221 also would also be driven by the guide rod 225. Besides, when the movable barrel 221 is rotating, the shaft 25 would be rotated by the guide rod 225.

Furthermore, the wind-guiding structure 23 including a plurality of pressurized channels 231, a first vortex chamber 232 and a decompression chamber 233 is disposed at the frame 24. The pressurized channel 231 includes an entrance 231A and an outlet 231B. A volume of the pressurized channel 231 from the entrance to the outlet gradually is reduced. In other words, a size of the entrance 231A is bigger than a size of the outlet 231B. As a result, when the external airflow gets smaller, the pressurized channel 231 could concentrate a wind volume to jet the airflow from outlet 231B.

Moreover, the first vortex chamber 232 is interconnected with the pressurized channel 231 via the outlet 231B. The decompression chamber 233 is surrounded by an annular board 233C. The decompression chamber 233 is interconnected with and above the first vortex chamber 232. In addition, the leaf group 22 is in the first vortex chamber 232 and the decompression chamber 233. Besides, when the first blade 223 is at rest, the first blade 223 is in the first vortex chamber 232. Therefore, when the external airflow is jetted to the first vortex chamber 232 through the pressurized channel 231, the first blade 223 would be rotated. Then, the movable barrel 221 is driven by the first blade 223 to rotate the shaft 25. Then, the rotor 210 is driven by the shaft 25. Afterward, the generator 21 would generate electricity.

Figure 2B:
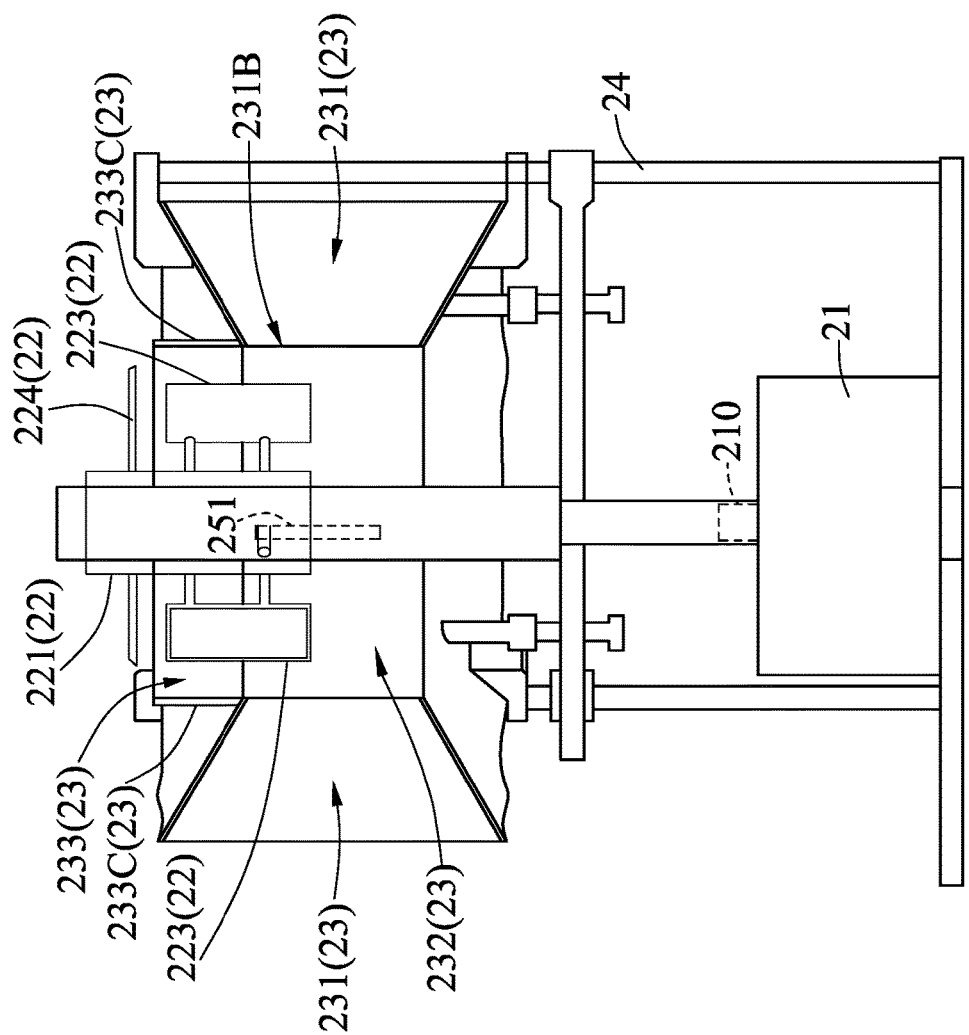
FIG. 2B illustrates a first blade 223 rising to decompression chamber 233.

Please refer to FIG. 2B. FIG. 2B illustrates a first blade 223 rising to decompression chamber 233. When the movable barrel 221 is rotated, the propeller blade 224 is also rotated synchronously. Therefore, when the wind gets bigger in the first vortex chamber 232, the propeller blade 224 would follow the airflow going up and move to the leaf group 22. As a result, the first blade 223 would rise to the decompression chamber 233. When the first blade 223 is in the decompression chamber 233, that the first blade 223 is pushed by the airflow to rotate is difficult. Thus, a rotating speed of the shaft 25 would be reduced. In contrast to the traditional wind power generation system 10, the wind power generation system 20 could avoid that the rotating speed of the shaft 25 beocmes too fast. Therefore, the incidence of failure of the generator 21 is reduced.

Figure 3:
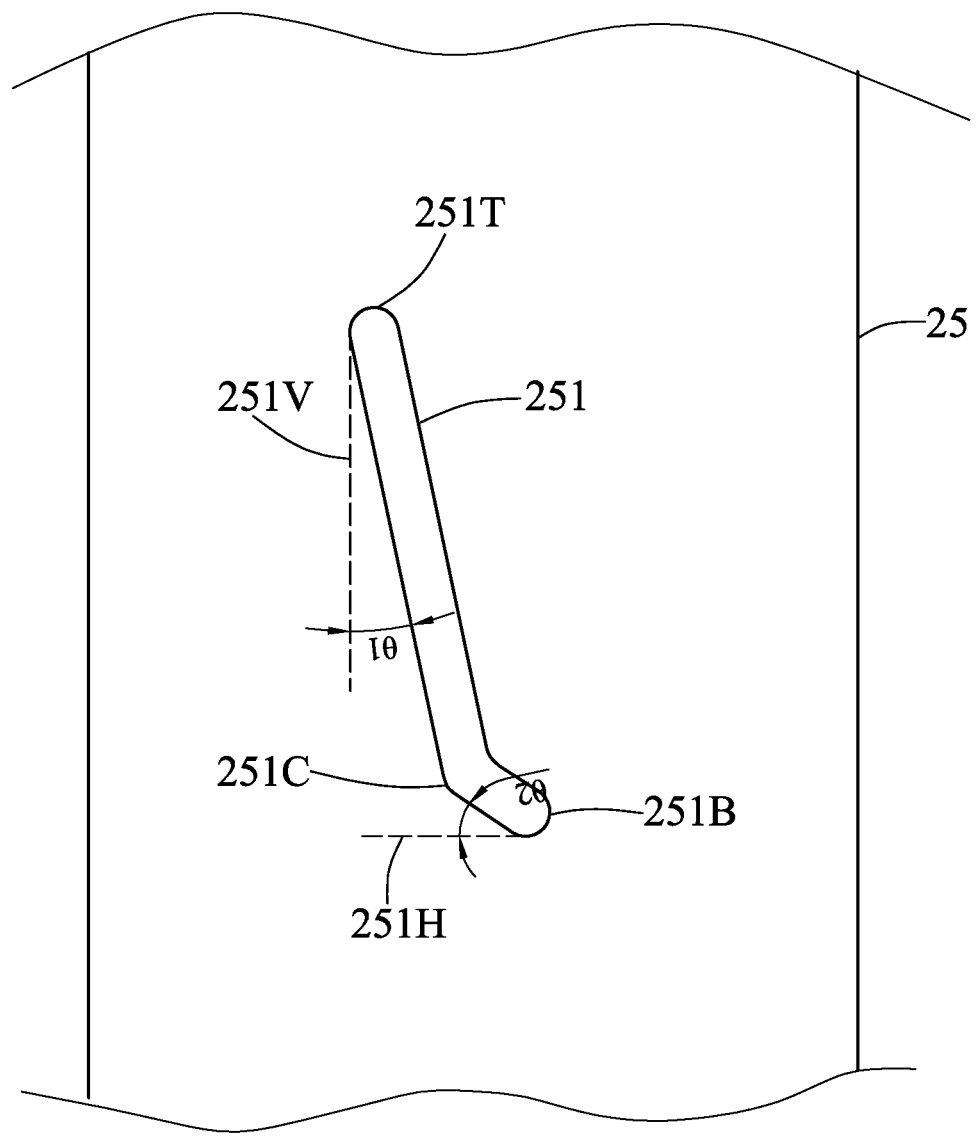
FIG. 3 illustrates a schematic diagram of a lifting groove 251.

Please refer to FIG. 3. FIG. 3 illustrates a schematic diagram of a lifting groove 251. The lifting groove 251 includes a top area 251T, a bottom area 251B and a bending section 251C. The bending section 251C is located between the top area 251T and a bottom area 251B. A first angle θ1 is formed between the lifting groove 251 which is between the top area 251T and the bending section 251C and a vertical virtual line 251V, and the first angle θ1 is equal to or less than 30 degrees. The guide rod 225 could lean on one side of the lifting groove 251 in order to rise to the top area 251T. Therefore, the first angle θ1 reduces the resistance of the guide rod 225 when it goes up. Furthermore, a second angle θ2 is formed between the lifting groove 251 which is between the bottom area 251B and the bending section 251C and a horizontal virtual line 251H, and the second angle θ2 is equal to or less than 30 degrees. When the guide rod 225 drops from the top area 251T to the bottom area 251B, the second angle θ2 could cushion a downward force of the guide rod 225.

Figure 4:
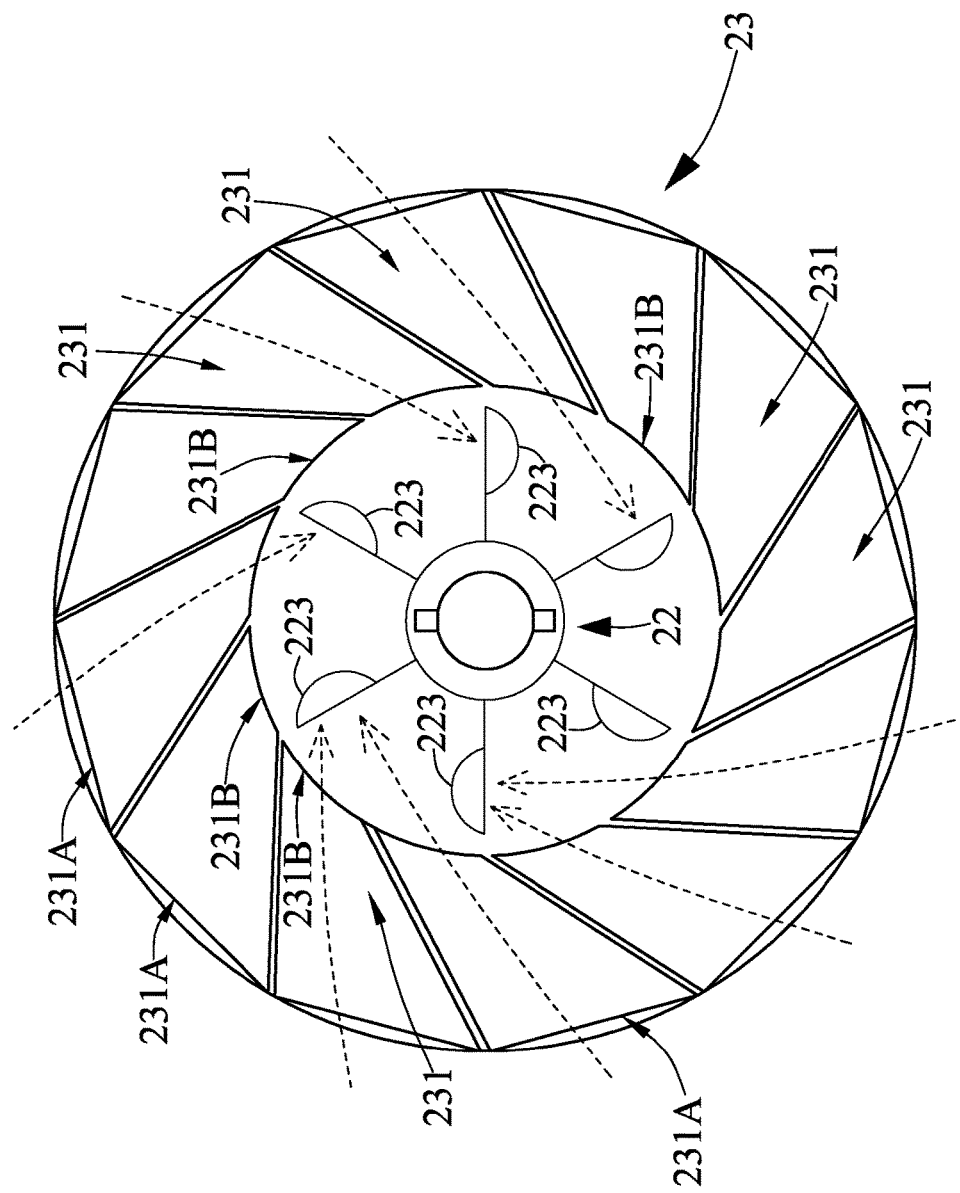
FIG. 4 illustrates a schematic diagram of a relative position of a wind-guiding structure 23 and a leaf group 22.

Please refer to FIG. 4. FIG. 4 illustrates a schematic diagram of a relative position of a wind-guiding structure 23 and a leaf group 22. Each outlet 231B substantially faces toward the first blade 223 and is oriented away from the movable barrel 221. Therefore, when the airflow is jetted from the outlet 231B, the airflow is substantially jetted to one side of the first blade 233. As a result, the leaf group 22 is more easily driven by the airflow, and the first blade 223 would be rotated in the same direction.

Figure 5:
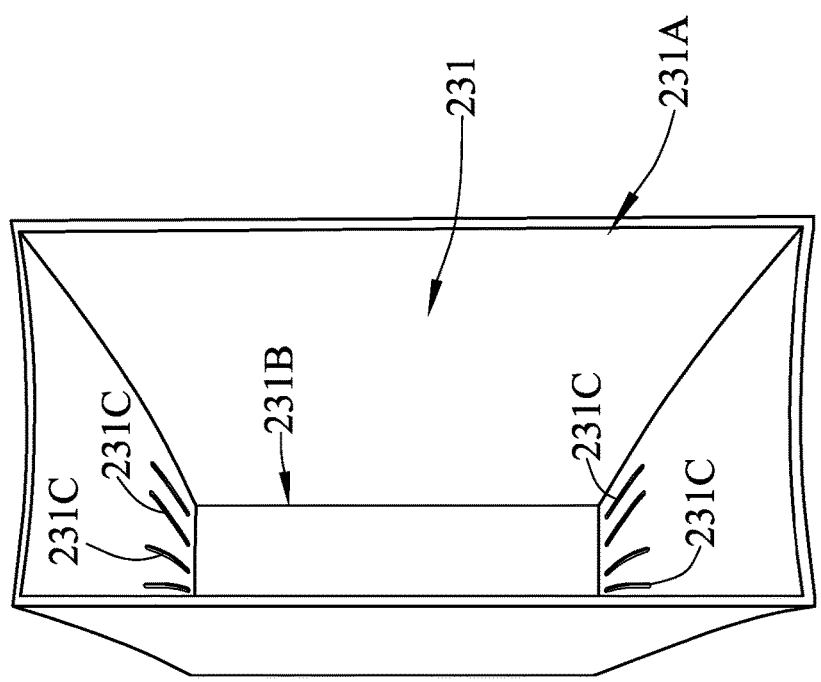
FIG. 5 illustrates a schematic diagram of a guide groove 231C disposed inside a pressurized channel 231.

Please refer to FIG. 5. FIG. 5 illustrates a schematic diagram of a guide groove 231C disposed inside a pressurized channel 231. A plurality of guide grooves 231C are disposed near the outlet 231B and on a surface of the pressurized channel 231. Because the gas pressure in the outlet 231B is reduced by the guide grooves 231C, the airflow could be guided to the outlet 231B by the guide grooves 231C. As a result, the airflow is more easily jetted to the first vortex chamber 232.

Figure 6A:
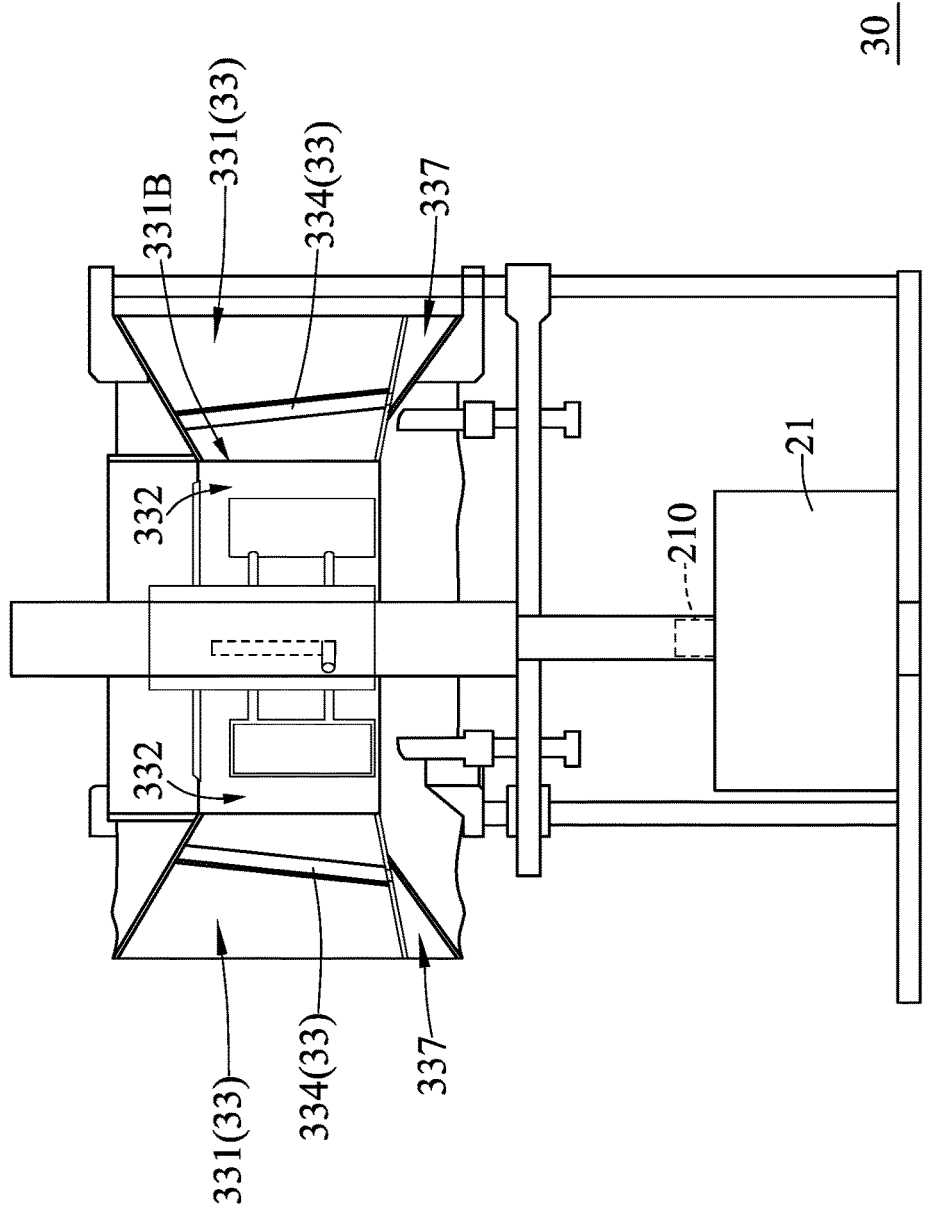
FIG. 6A illustrates a wind power generation system 30 in accordance with second embodiment of the present invention.
Figure 6B:
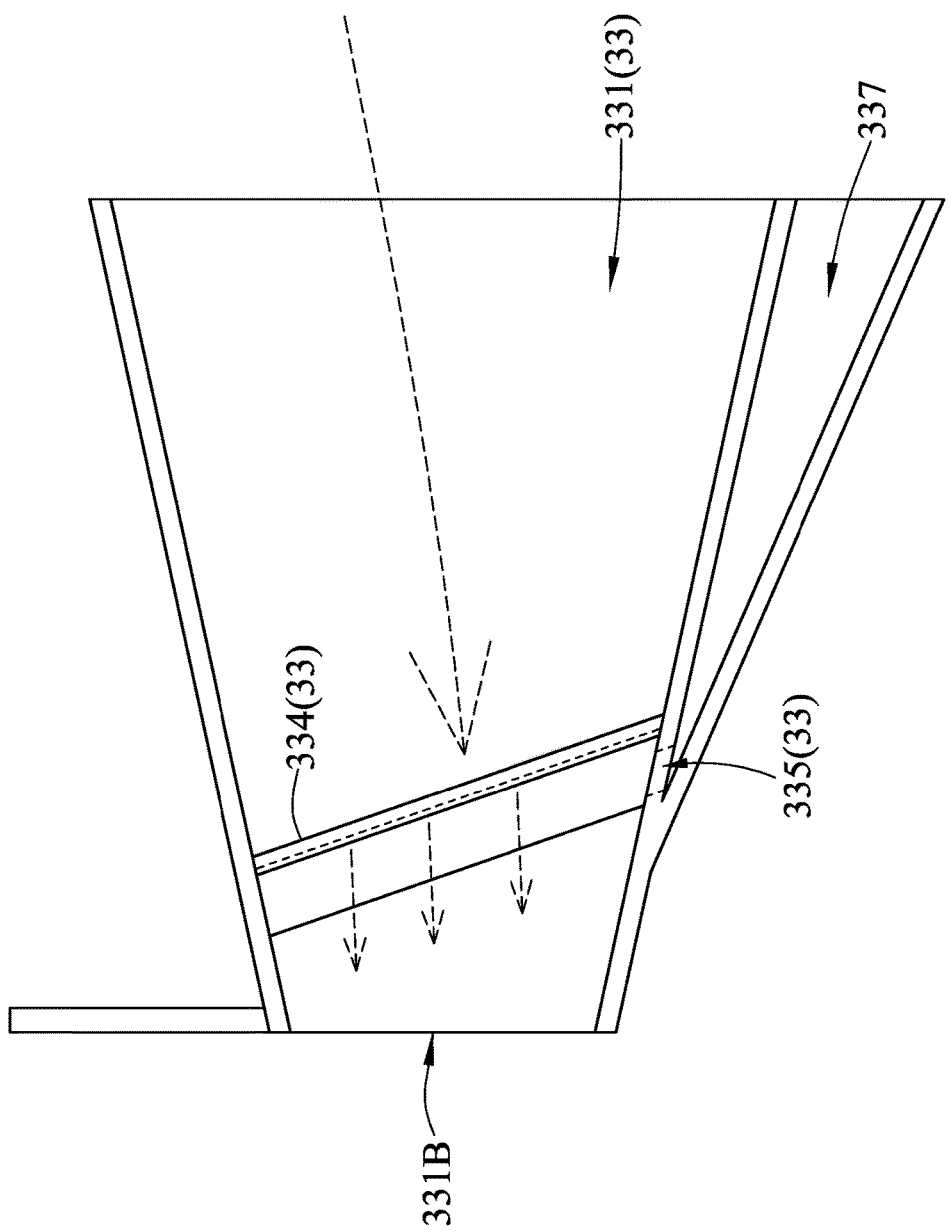
FIG. 6B illustrates a schematic diagram of a pressurized channel 331 and guide channel 337.
Figure 6C:
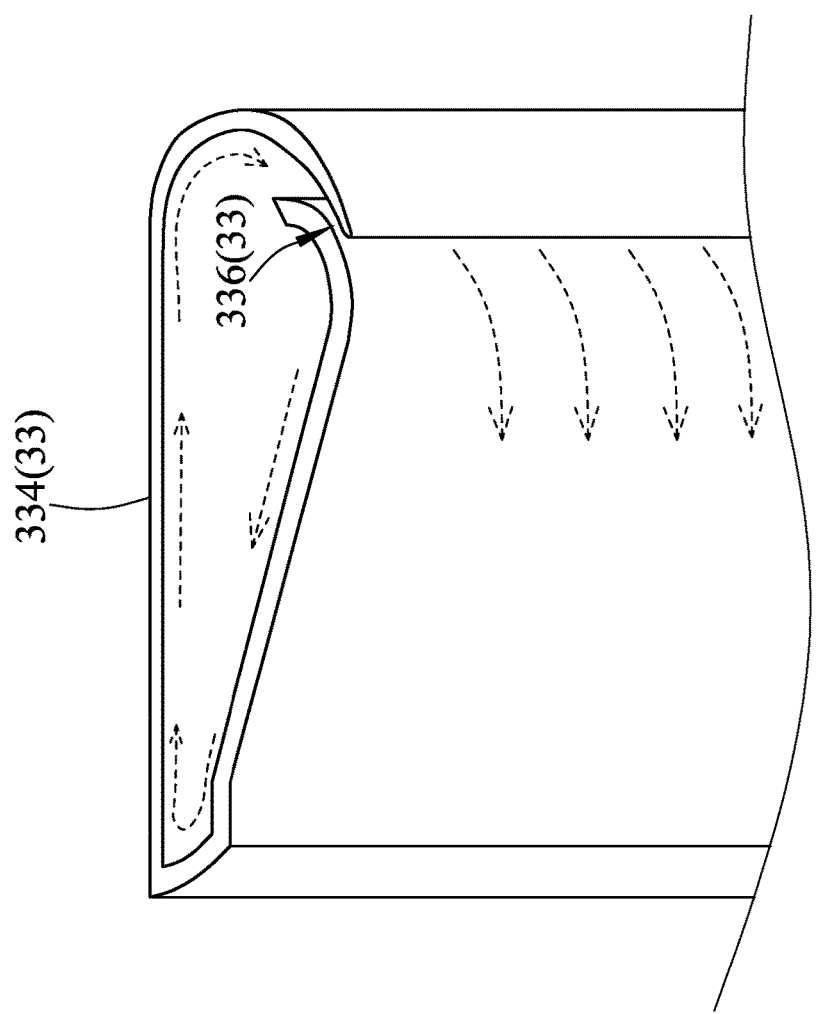
FIG. 6C illustrates a schematic diagram of a second vortex chamber 334.

Please refer to FIG. 6A, FIG. 6B and FIG. 6C. FIG. 6A illustrates a wind power generation system 30 in accordance with second embodiment of the present invention. FIG. 6B illustrates a schematic diagram of a pressurized channel 331 and guide channel 337. FIG. 6C illustrates a schematic diagram of a second vortex chamber 334. The difference between the wind power generation system 30 and the wind power generation system 20 is that the pressurized channel 331 of the wind power generation system 30 further includes a second vortex chamber 334 and a through hole 335. The second vortex chamber 334 including a slit outlet 336 is in the pressurized channel 331. Furthermore, the second vortex chamber 334 is interconnected with a guide channel 337 which is outside the pressurized channel 331 via the through hole 335. When an airflow flows into second vortex chamber 334 through the guide channel 337, the airflow is swirled in the second vortex chamber 334. Then, the airflow is jetted from the slit outlet 336. Therefore, the airflow in the pressurized channel 331 is guided by the airflow in the second vortex chamber 334 to the outlet 331B to increase the strength of the airflow in the first vortex chamber 333.

Figure 7:
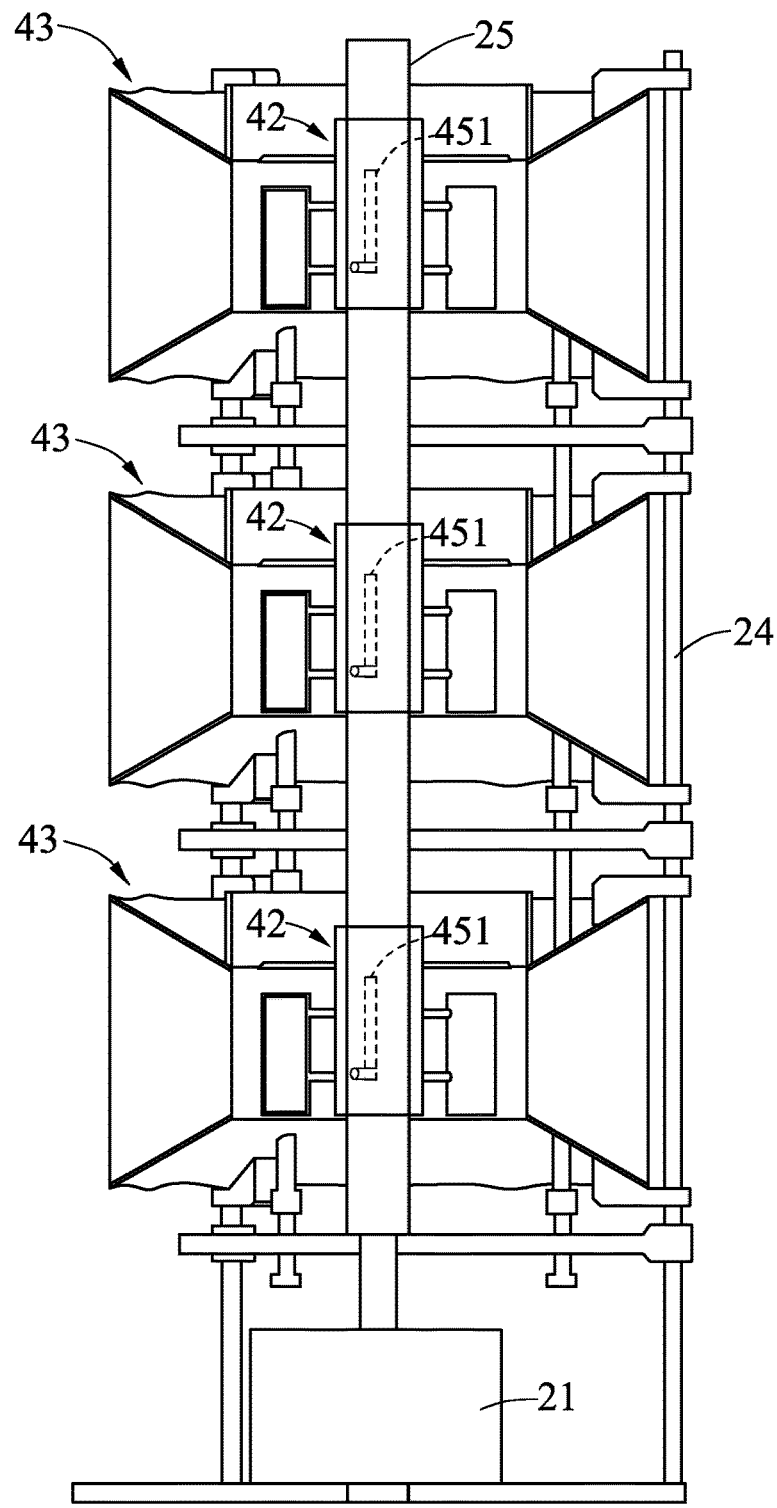
FIG. 7 illustrates a wind power generation system 40 in accordance with third embodiment of the present invention.

Please refer to FIG. 7. FIG. 7 illustrates a wind power generation system 40 in accordance with third embodiment of the present invention. The difference between the wind power generation system 40 and the wind power generation system 20 is that the wind power generation system 40 includes a plurality of wind-guiding structures 43, a plurality of leaf groups 42 and a plurality of lifting grooves 451. The wind-guiding structures 43 is disposed at the frame 24 in a stacked manner, and each wind-guiding structure 43 is internally provided with the leaf group 42. When the shaft 25 is driven by a plurality of the leaf groups 42, the wind power generation system 40 could achieve an excellent power generation.

Figure 8:
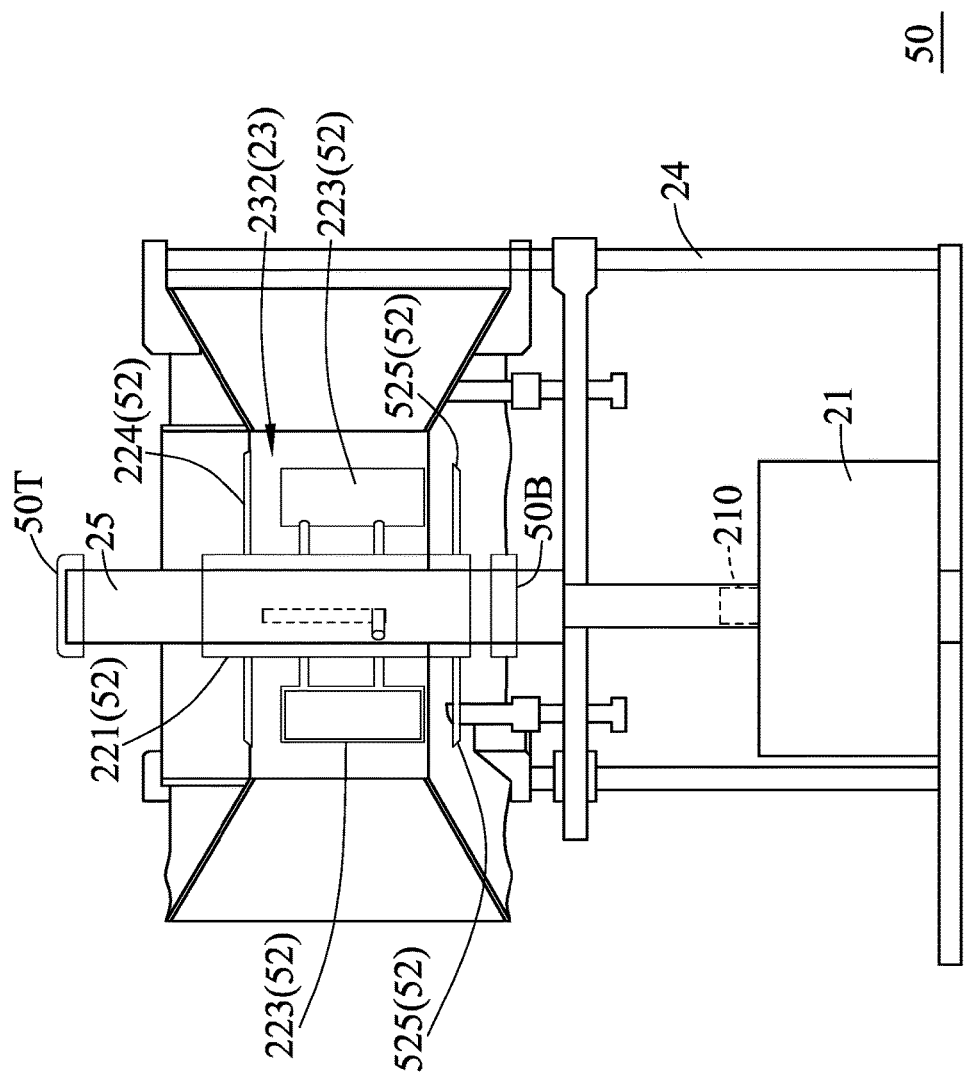
FIG. 8 illustrates a wind power generation system 50 in accordance with fourth embodiment of the present invention.

Please refer to FIG. 8. FIG. 8 illustrates a wind power generation system 50 in accordance with fourth embodiment of the present invention. The difference between the wind power generation system 50 and the wind power generation system 20 is that the wind power generation system 50 includes a top cover 50T and blocking ring 50B, and the leaf group 52 of the wind power generation system 50 includes a second blade 525. The top cover 50T is disposed at a top of the shaft 25, and the blocking ring 50B is sleeved on the shaft 25 and under the movable barrel 221. Thus, the top cover 50T and the blocking ring 50B could prevent the movable barrel 221 from leaving the shaft 25. In addition, the second blade 525 is connected to the movable barrel 221 and under the first blade 223. The rotating second blade 525 promotes that the airflow in the first vortex chamber 232 flows into the generator 21.

Although the description above contains many specifics, these are merely provided to illustrate the invention and should not be construed as limitations of the invention's scope. Thus, it will be apparent to those skilled, in the art that various modifications and variations can be made in the system and processes of the present invention without departing from the spirit or scope of the invention.

What is claimed is:

1. A wind power generation system comprising:
    a generator including a rotor;
    a shaft connected to the rotor;
    at least one leaf group including:
        a movable barrel movably sleeved on the shaft;
        at least one first blade connected to the movable barrel; and
        at least one propeller blade connected to the movable barrel and above the first blade; and
    at least one wind-guiding structure including:
        a plurality of pressurized channels, the pressurized channel including an entrance or an outlet, a volume of the pressurized channel from the entrance to the outlet gradually reduced;
        a first vortex chamber interconnected with the pressurized channel via the outlet;
        a decompression chamber surrounded by an annular board, the decompression chamber being above and interconnected with the first vortex chamber;
    wherein when the first blade is at rest, the first blade is in the first vortex chamber; wherein the shaft includes a lifting groove, and the leaf group includes a guide rod which passes through the movable barrel and is embedded in the lifting groove.

2. The wind power generation system of claim 1, wherein the lifting groove includes a top area, a bottom area and a bending section, and the bending section is between the top area and the bottom area; wherein a first angle is formed between the lifting groove which is between the top area and the bending section and a vertical virtual line, the first angle is equal to or less than 30 degrees; wherein a second angle is formed between the lifting groove which is between the bottom area and the bending section and a horizontal virtual line, the second angle is equal to or less than 30 degrees.

3. The wind power generation system of claim 1, wherein when an airflow is from the outlet, the airflow is substantially jetted on the first blade.

4. The wind power generation system of claim 1, wherein the leaf group includes at least one a second blade, the second blade is connected to the movable barrel and under the first blade.

5. The wind power generation system of claim 1 further comprising a frame, wherein a plurality of the wind-guiding structures is disposed at the frame in a stacked manner.

6. The wind power generation system of claim 1, wherein a surface of the pressurized channel includes a plurality of guide grooves, and the guide groove is near the outlet.

7. The wind power generation system of claim 1 further comprising a top cover and a blocking ring, the top cover disposed at a top of the shaft, and the blocking ring sleeved on the shaft and under the movable barrel.

8. The wind power generation system of claim 1, wherein the pressurized channel further includes a second vortex chamber and a through hole, the second vortex chamber is in the pressurized channel, the second vortex chamber is interconnected with a guide channel via the through hole, and the guide channel is outside the pressurized channel.

9. The wind power generation system of claim 7, wherein the second vortex chamber includes a slit outlet, an airflow in the second vortex is jetted from the slit outlet.

* * * * *